United States Patent [19]

Boda et al.

[11] Patent Number: 4,838,820

[45] Date of Patent: Jun. 13, 1989

[54] PREASSEMBLED THROTTLE CABLE LINKAGE

[75] Inventors: James C. Boda, Winneconne; Robert J. Baumhardt, Eden; Bruce A. Heidel, Fond du Lac, all of Wis.

[73] Assignee: Brunswick Corporation, Skokie, Ill.

[21] Appl. No.: 89,585

[22] Filed: Aug. 26, 1987

[51] Int. Cl.⁴ .............................................. B60K 26/00
[52] U.S. Cl. ........................................ 440/87; 74/513; 74/500 R; 440/84
[58] Field of Search ............... 114/154, 155, 156, 157, 114/158, 159, 160, 161; 440/87; 74/501 R, 501 A, 506

[56] References Cited

U.S. PATENT DOCUMENTS

| | | | |
|---|---|---|---|
| 3,403,578 | 10/1968 | Morse | 114/160 |
| 3,503,275 | 3/1970 | Morse | 74/501 R |
| 4,041,797 | 8/1977 | Mito | 74/501 R |
| 4,231,316 | 11/1980 | Bland et al. | 74/506 |
| 4,449,420 | 5/1984 | Baba | 74/506 |
| 4,549,869 | 10/1985 | Iida et al. | 440/87 |

FOREIGN PATENT DOCUMENTS 531778 10/1976 U.S.S.R. .

Primary Examiner—Sherman D. Basinger
Assistant Examiner—Thomas J. Brahan
Attorney, Agent, or Firm—Robert C. Curfiss

[57] ABSTRACT

A preassembled throttle cable and pulley assembly includes a pair of pulleys contained within pulley housings. A pair of throttle cables are strung around the pulleys in a predetermined manner and the cable ends are contained within the pulley housings. The pulleys are keyed so as to insure their attachment to a tiller and throttle linkage in a proper configuration.

3 Claims, 2 Drawing Sheets

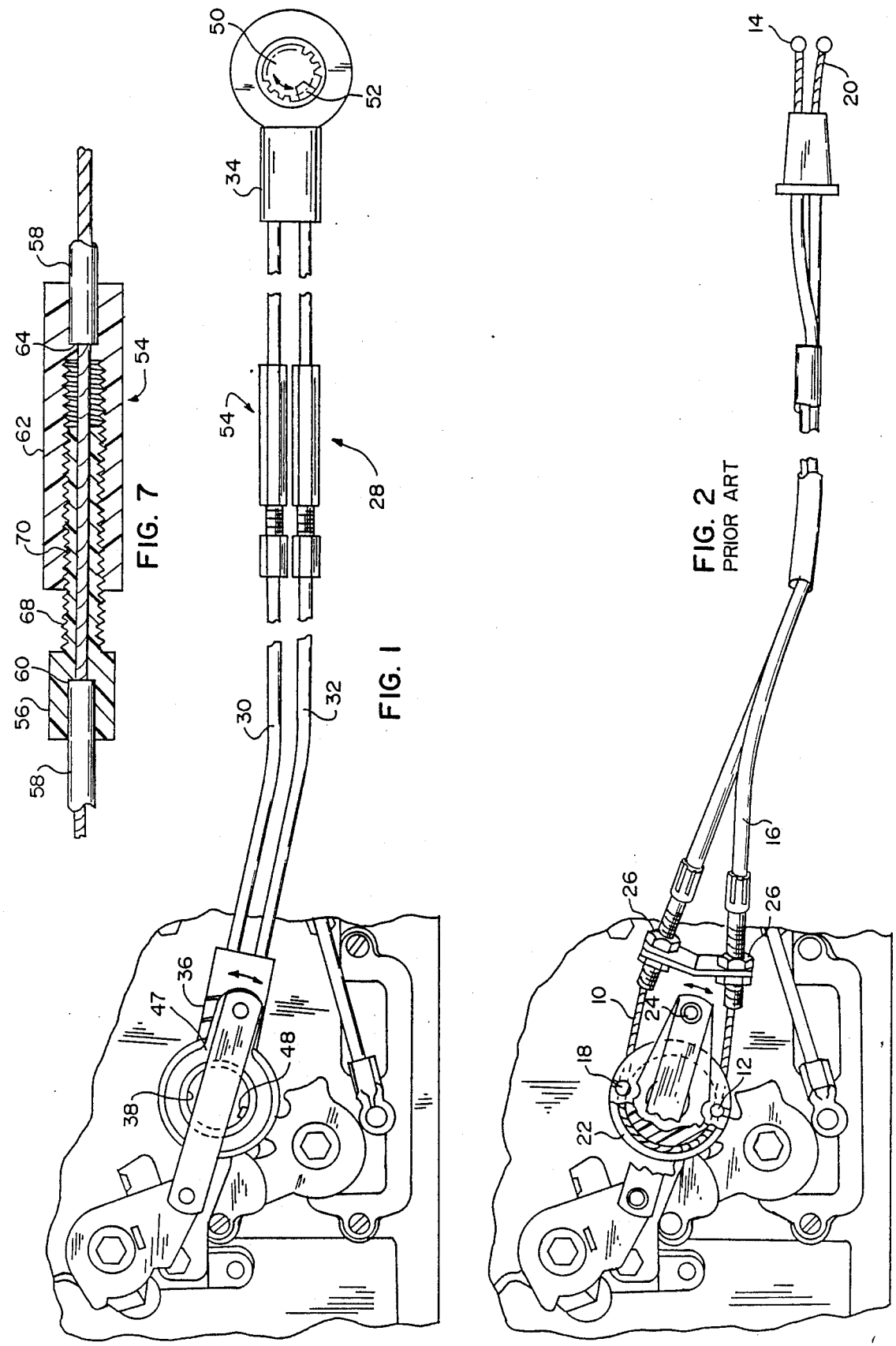

PREASSEMBLED THROTTLE CABLE LINKAGE

BACKGROUND OF THE INVENTION

This invention relates to throttle cables and more particularly to a self-contained throttle cable and pulley assembly.

In some types of marine engines and particularly marine outboard engines, the operation of the throttle linkage in the engine and thus the speed of the engine is controlled by rotation of the tiller handle. This movement is communicated to the throttle linkage by a pair of throttle cables. The throttle cables would translate the rotational movement of the tiller into corresponding rotational movement of a pulley type wheel associated with the throttle linkage of the engine.

In the past (as shown in FIG. 2), installation or replacement of the throttle cables required that a pair of individual throttle cable ends be strung over a throttle linkage pulley wheel and the other ends of the cables be correctly attached to a tiller pulley. If the cables were crossed or otherwise incorrectly attached to the pulley wheels, it would result in a situation where movement of the tiller handle, in a direction intended to cause a lower motor speed, would actually result in an increased motor speed, due to the incorrect installation of the cable ends on their associated pulley wheels. Also, once the cable ends were attached to the pulleys, it was necessary for the cable tension to be adjusted at one or both ends of the cables.

It is the purpose of the present invention to provide a preassembled throttle cable and pulley assembly which eliminates the need for precisely stringing throttle cables over tiller and throttle linkage pulleys and thus, eliminates the possibility of reversing the orientation of the cable ends.

It is also a purpose of the present invention to provide readily accessible and easily operated cable tension adjustment.

SUMMARY OF THE INVENTION

A preassembled throttle cable and pulley assembly includes a first pulley disposed within a housing and having fastening means for securing a pair of cable ends to the pulley.

In accordance with one aspect of the invention, a second pulley is provided which is disposed within a second pulley housing and also includes means for securing cable ends to the pulley.

In accordance with another aspect of the invention, a pair of cables are provided having their ends attached to the pulleys in a predetermined fashion.

In accordance with yet another aspect of the invention, each of the pulleys is keyed so that they may only be attached to the associated tiller and throttle linkage in a predetermined orientation.

In accordance with still another aspect of the invention, the pulley intended to be used on the throttle linkage is provided with a pair of distinct sides so as to allow the pulley to be used with alternate types of throttle linkages.

In accordance with yet another aspect of the invention, each of the pulley cables is provided with a cable tension adjustment mechanism, intermediate of the ends of the cable, to facilitate the adjustment of cable tension.

BRIEF DESCRIPTION OF THE DRAWINGS

The drawings illustrate the best mode presently contemplated of carrying out the invention.

In the drawings:

FIG. 1 is a side view of a preassembled throttle cable linkage constructed according to the present invention and showing one end of the assembly connected to the throttle linkage of an internal combustion engine;

FIG. 2 is a side view of prior art throttle cables with one end of the cables connected to the throttle linkage of an internal combustion engine;

DESCRIPTION OF THE PREFERRED EMBODIMENT

Figure 3:
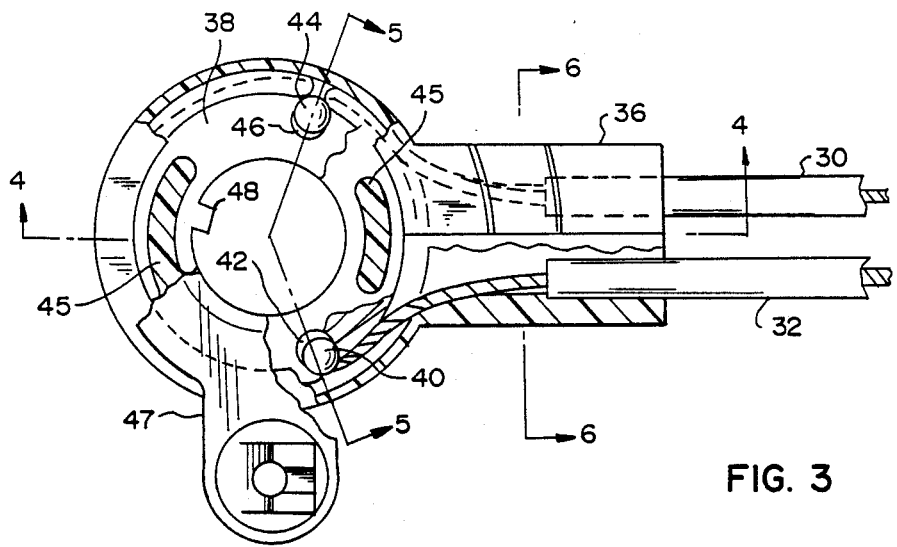
FIG. 3 is a side cross sectional view of one of the pulleys of the preassembled throttle cable linkage.
Figure 4:
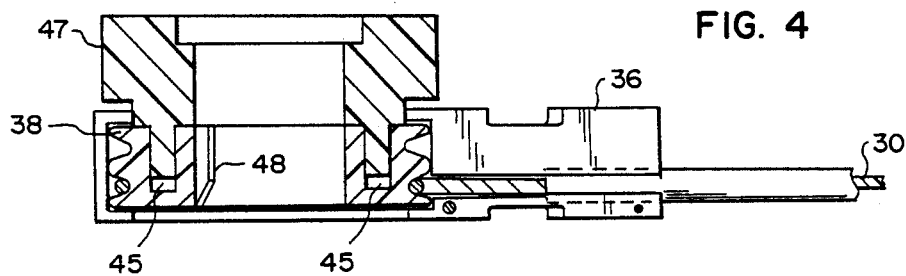
FIG. 4 is a sectional view along the line 4—4 of FIG. 3.
Figure 5:
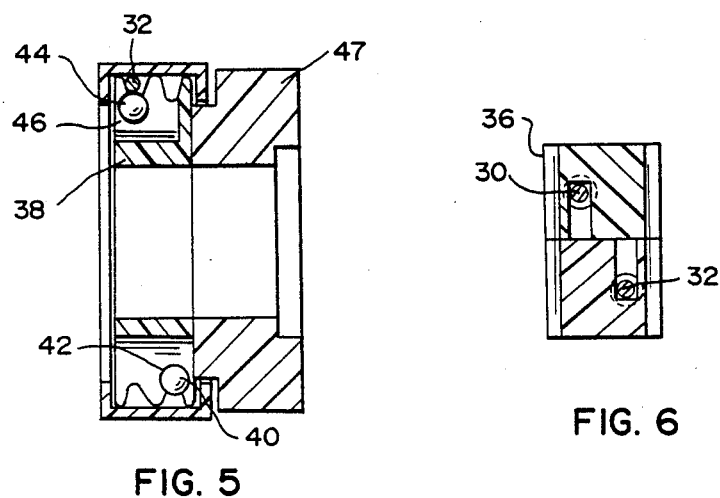
FIG. 5 is a sectional view along the line 5—5 of FIG. 3.
Figure 6:
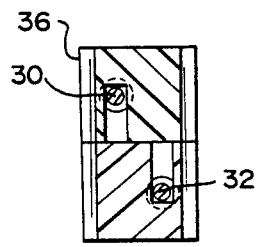
FIG. 6 is a sectional view along the line 6—6 of FIG. 3.

As mentioned above, in certain marine outboard engines, the engine speed is controlled by the rotation of the tiller handle. The movement of the tiller handle is communicated to a throttle linkage on the engine by a pair of cables. The prior art cable linkage is shown in FIG. 2 and includes a first cable 10 having a first end 12 and a second end 14. A second cable 16 was provided having a first end 18 and a second end 20. In assembling the throttle cable assembly, the installer would wind first end 12 around throttle pulley 22 in a counterclockwise manner and string first end 18 of second cable 16 around throttle pulley 22 in a clockwise fashion. The cable ends would then be secured to pulley 22 and the installer would proceed to attach cable ends 14 and 20 to the tiller handle (not shown). Thus, rotation of the tiller handle would result in corresponding rotation of throttle pulley 22 which would in turn cause throttle linkage 24 to rotate and either increase or decrease engine speed. Once the throttle cables were installed, the tension of the cables would be adjusted by manipulating cable adjustment mechanisms 26 located adjacent the throttle linkage 24. It can be seen that if the cable ends were wound around pulley 22 in the wrong direction or if the cable ends became twisted and/or interchanged, that this would result in the situation where movement of the tiller in a direction intended to decrease or increase engine speed would have the opposite effect on the throttle linkage.

FIG. 1 illustrates a preassembled throttle cable and pulley assembly 28 that includes a pair of cables 30 and 32 whose ends are disposed within first and second pulley casings 34 and 36.

FIG. 3 best illustrates the interior of pulley casing 36 and it is to be understood that pulley casing 34 includes a similar pulley and operates in a similar fashion. Upon entering pulley casing 36, pulley cable 30 winds around pulley 38 in a counterclockwise direction and is secured to pulley 38 by means of a ball 40 located at the terminal end of cable 30 and disposed within a notch 42 in pulley 38.

Similarly, cable 32 enters pulley casing 36 and is wound in a clockwise direction around pulley 38 and secured to pulley 38 by means of ball 44 and notch 46.

One side of pulley 38 is provided with a pair of slots 45 that are engageable with a predetermined type of throttle linkage 47. The other side of pulley 38 is provided with a hole and key arrangement 48 which allows pulley 38 to be attached to an alternate type of throttle linkage (not shown). Thus, pulley housing 36 and its associated pulley 38 may be used with alternative types of throttle linkages merely by rotating casing 36 and pulley 38.

With cable housing 34, the opposite end of cable 30 is wound in a clockwise fashion and secured to pulley 50 and the opposite end of cable 32 is wound in a counterclockwise fashion and secured to pulley 50. Pulley 50 is also provided with a key 52 so as to insure its proper positioning on the tiller handle (not shown). Thus, once pulley 50 and its casing 34 have been attached to the tiller handle and pulley 38 and its casing 36 have been connected to the throttle linkage, there can be no doubt that rotation of the tiller handle will result in a proper direction of rotation of throttle pulley 38.

As shown in FIGS. 1 and 7, throttle cables 30 and 32 are each provided with an adjustment mechanism located intermediate of the ends of the cables. Adjustment mechanism 54 includes a first piece 56 which is slidably disposed over cable sheath 58 and which provides an abutment 60 for the end of sheath 58. Adjustment mechanism 54 further includes a second piece 62 which is also slidably disposed over sheath 58 and provides an abutment 64 for a piece of sheath 58 opposing that in first piece 56. First piece 56 includes a threaded extension 66 which mates with interior threads 70 in piece 62. Rotation of either part 56 or 62 thus results in either an increase or decrease in the distance between pieces 56 and 62 which in turn results in either an increase or decrease in the tension within its contained cable.

It is recognized that various alternatives and modifications are possible in the scope of the appended claims.

We claim:

1. In a throttle system for an outboard marine engine in which rotational movement of a tiller handle results in corresponding rotational movement of a throttle linkage so as to control engine speed, a preassembled throttle cable linkage for translating tiller movement to throttle linkage movement, said linkage comprising:

a first pulley sealed within a first pulley casing and having fastening means for securing cables to said pulley in a predetermined configuration and said pulley having connecting means for securing said pulley and said casing to the tiller handle in a predetermined position so that rotational movement of the tiller handle results in rotational movement of said first pulley within said casing, a second pulley sealed within a second pulley casing and having fastening means for securing cables to said pulley in a predetermined configuration and said second pulley having connecting means for securing said pulley and said casing to the throttle linkage in a predetermined position so that rotational movement of said second pulley within said casing results in a movement of said throttle linkage, a first pulley cable having a first end attached to said first pulley and a second end attached to said second pulley so that rotation of said first pulley in a first direction results in rotation of said second pulley in a first direction, and a second pulley cable having a first end attached to said first pulley and a second end attached to said second pulley so that rotation of said first pulley in a second direction results in rotation of said second pulley in a second direction, said first and second directions being predetermined and fixed by the sealing of said pulleys within said casings.

2. The throttle cable linkage defined in claim 1 further comprising adjustment means disposed intermediate of said ends of said cables for adjusting the tension in said cables.

3. The throttle cable defined in claim 1 wherein said second pulley and said second pulley casing have a first side having connecting means for securing said pulley to a first type of throttle linkage and said pulley housing have a second side having connecting means for securing said pulley to a second type of throttle linkage.

* * * * *